US008677169B2

(12) United States Patent
Haag et al.

(10) Patent No.: US 8,677,169 B2
(45) Date of Patent: *Mar. 18, 2014

(54) SESSION REDUNDANCY USING A REPLAY MODEL

(75) Inventors: Jeffrey David Haag, Raleigh, NC (US); Gary Lee Harris, Raleigh, NC (US); Samuel G. Henderson, Raleigh, NC (US); Richard Foltak, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/307,120

(22) Filed: Nov. 30, 2011

(65) Prior Publication Data

US 2012/0072757 A1 Mar. 22, 2012

Related U.S. Application Data

(63) Continuation of application No. 11/841,025, filed on Aug. 20, 2007, now Pat. No. 8,074,094.

(60) Provisional application No. 60/947,405, filed on Jun. 30, 2007.

(51) Int. Cl.
*G06F 9/52* (2006.01)

(52) U.S. Cl.
USPC .............................. 713/375; 713/400; 714/13

(58) Field of Classification Search
USPC ..................................... 713/375, 400; 714/13
See application file for complete search history.

(56) References Cited

U.S. PATENT DOCUMENTS

| 6,470,462 | B1 * | 10/2002 | Karlsson et al. ................ 714/11 |
| 7,006,431 | B1 * | 2/2006 | Kanekar et al. ............... 370/217 |
| 7,535,826 | B1 * | 5/2009 | Cole et al. ..................... 370/218 |
| 2003/0046604 | A1 * | 3/2003 | Lau et al. ........................ 714/11 |
| 2004/0153624 | A1 * | 8/2004 | Zhou et al. ........................ 712/4 |
| 2005/0120139 | A1 * | 6/2005 | Kochhar et al. ............... 709/248 |
| 2005/0135233 | A1 * | 6/2005 | May .............................. 370/216 |
| 2008/0125886 | A1 * | 5/2008 | King et al. ...................... 700/82 |

* cited by examiner

*Primary Examiner* — Kim Huynh
*Assistant Examiner* — Zahid Choudhury
(74) *Attorney, Agent, or Firm* — Campbell Stephenson, LLP (57) ABSTRACT

A mechanism for synchronizing states of components in a first routing engine to corresponding components in a second routing engine is provided. In order to reduce the amount of data required to synchronize the state of the components and the time and resources required to perform the synchronization, the state-related information transmitted from the first routing engine to the second routing engine is limited to information used to build states of a subset of the components associated with the first routing engine. That subset of components is limited to those components that receive stimuli (e.g., data streams or data packets) from sources external to the routing engine. Other components on the second routing engine synchronize state by receiving information from those components on the second routing engine that received the external stimuli information.

17 Claims, 4 Drawing Sheets

SESSION REDUNDANCY USING A REPLAY MODEL

CROSS-REFERENCE TO RELATED APPLICATIONS

This application is a continuation of U.S. patent application Ser. No. 11/841,025 (issued as U.S. Pat. No. 8,074,094), entitled "Session Redundancy Using a Replay Model," filed Aug. 20, 2007, and naming Jeffrey David Haag, Gary Lee Harris, Samuel G. Henderson, and Richard Foltak as inventors, which claims the domestic benefit under Title 35, United States Code §119(e) of U.S. Provisional Patent Application Serial No. 60/947,405, entitled "Session Redundancy Using A Replay Model," filed Jun. 30, 2007. That application is assigned to Cisco Technology, Inc., the assignee of the present invention, and is hereby incorporated by reference, in its entirety and for all purposes.

FIELD OF THE INVENTION

This invention relates to the field of information networks, and more particularly relates to providing redundant routing engines within a network routing device configured to provide broadband aggregation services.

BACKGROUND OF THE INVENTION

The increasing need for Internet connectivity places huge demands on Internet service providers, not just in the number and types of connections that users require for Internet access, but also in the services that these users require on each connection. The Internet's explosive growth is driving the requirements for higher quality, faster connectivity, greater reliability, and more software features for an ever-growing number of customers.

The edge of a service provider network, the point at which a customer's enterprise network intersects with the service provider network, is rapidly becoming an area of strategic significance. At the edge, network customers attach to the service provider's network and service providers can apply services and aggregate broadband and leased-line traffic. This has to be accomplished without compromising performance and reliability.

In particular, the broadband aggregation services market is rapidly evolving. Service provisioning and subscriber management offerings of products in this market have had limited availability, performance and scale.

It is therefore desirable to provide an edge network routing device capable of providing broadband services aggregation with high availability. Such broadband services can include PPP, L2TP and 802.1q type protocols. Such a device can provide value-added revenue generating services over a broadband access infrastructure and deliver superior availability, scalability, performance, dynamic quality of service capabilities and advanced network access services at a low cost.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a mechanism for synchronizing states of components in a first routing engine to corresponding components in a second routing engine. In order to reduce the amount of data required to synchronize the state of the components and the time and resources required to perform the synchronization, the state-related information transmitted from the first routing engine to the second routing engine can be limited to information used to build states of a subset of the components associated with the first routing engine. Embodiments of the invention limit that subset of components to those components that receive stimuli (e.g., data streams or data packets) from sources external to the routing engine. Aspects of the present invention provide for other components on the second routing engine synchronizing state by receiving information from those components on the second routing engine that received the external stimuli information.

Thus, the present invention provides for synchronization of a standby routing engine by transferring state-related information associated with less than all of the components associated with an active routing engine, and then processing that information on the standby routing engine to synchronize the states of all components. This lies in contrast to previous synchronization strategies wherein the state information of all the components is provided to a standby routing engine and then the relationships between the various components on the standby are resolved through a complex and time-consuming process.

Example Network Environment

Figure 1:
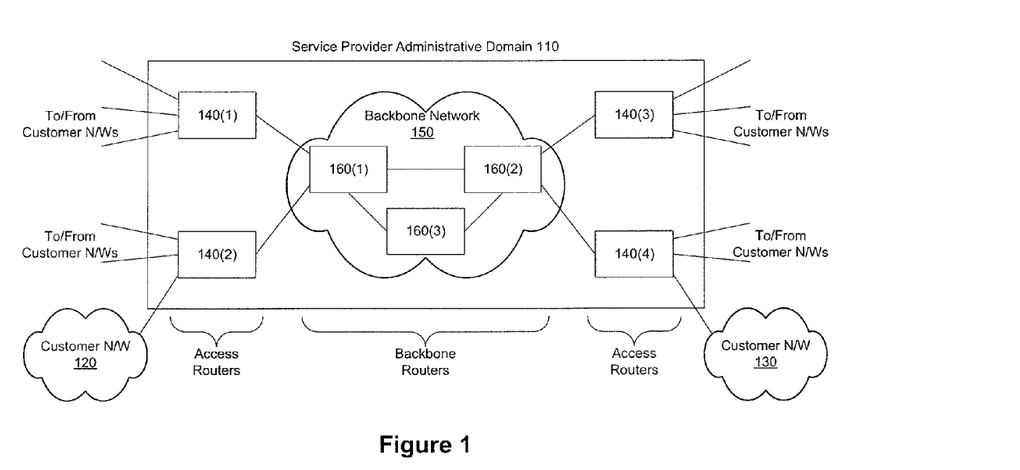
FIG. 1 is a simplified block diagram illustrating an example of a typical network configuration in which a network routing device embodying the present invention can be utilized.

FIG. 1 is a simplified block diagram illustrating an example of a typical network configuration in which a network routing device embodying the present invention can be utilized. A service provider administrative domain 110 is coupled to customer networks 120 and 130. Connections from customer networks 120 and 130 can be provided by, for example, metropolitan-area fiber-optic ring technology, DSL, cable, and the like, using a variety of networking encapsulation protocols, such as PPP, L2TP or 802.1q. Access routers 140(1)-(4) are edge routers that provide individual customers with access to the service provider's backbone network 150. Access routers can be configured to provide large numbers of relatively low-speed or broadband ports connecting to subscribers. Access routers 140(1)-(4) are in turn coupled to the service provider's backbone network 150 via backbone routers 160(1)-160(3). Typically, backbone routers provide network transport with an emphasis on achieving a highest possible forwarding rate on a fastest available interface.

As network traffic continues to grow, the demands for access routers to handle increased density and greater throughput become more important. Such density and performance requirements can be met with a type of access router called an aggregation router. An aggregation router is an access router that aggregates large numbers of inputs from customer networks into a few trunk lines for entry onto the service provider backbone network. Aggregation routers are typically designed for very high throughput performance on a large number of input lines, both relatively low-speed leased-line interfaces and broadband interfaces, with value-added network services enabled on each connection. Since aggregation routers are a point of access to the service provider's backbone network for many customers and many types of incoming data, high availability of an aggregation router and the services the aggregation router provides is important. Embodiments of the present invention are incorporated into aggregation routers to provide the desired high availability, by providing redundant routing engines with duplicated states, as discussed below.

Example Network Routing Device

Figure 2:
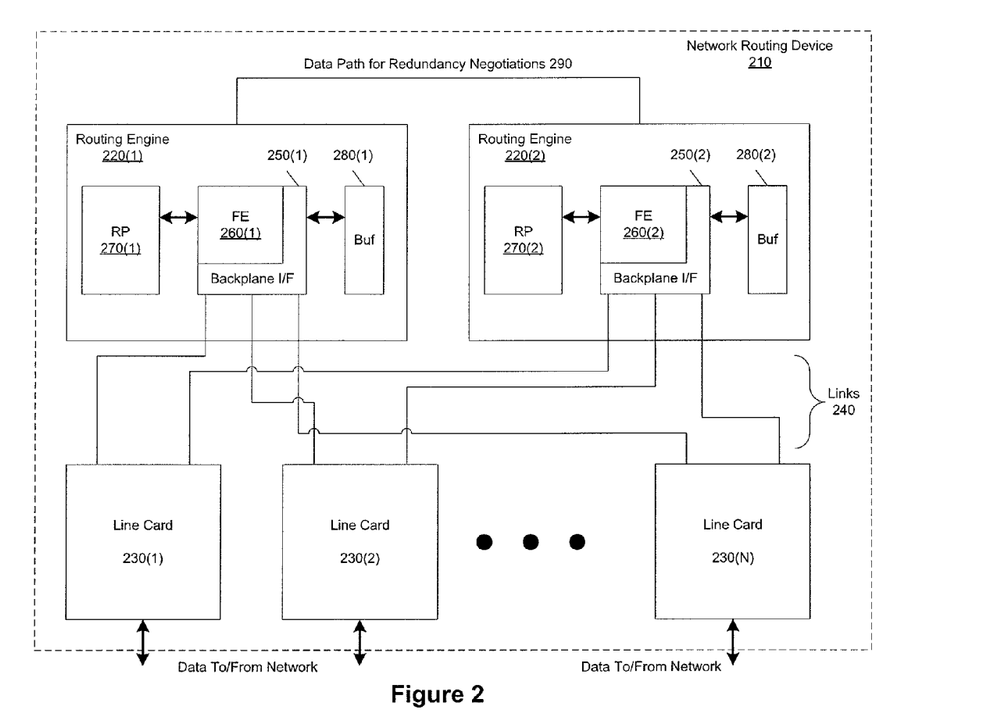
FIG. 2 is a simplified block diagram of an example of a network routing device configurable to incorporate embodiments of the present invention.

FIG. 2 is a simplified block diagram of an example of a network routing device configured to incorporate embodiments of the present invention. Network routing device 210 includes redundant routing engines 220(1) and 220(2). Routing engines 220(1) and 220(2) are coupled to line cards 230(1)-(N) via links 240. Links 240 provide a data path for packets and other data between each line card and each routing engine. Links 240 are illustrated as point-to-point data paths from each line card to each routing engine, but can also take other forms of data paths, such as a bus. Line cards 240 are further configured to be coupled to corresponding networks (e.g., a customer network 120 or a backbone network 150) and to transmit and receive data to or from those networks.

As illustrated in FIG. 2, each routing engine contains corresponding sets of elements. Each routing engine includes a backplane interface 250(1) or 250(2), which provides a coupling point for links 240. The backplane interface is coupled to a forwarding engine 260(1) or 260(2). One example of a forwarding engine takes the form of one or more processors configured to process incoming data packets from the line cards according to information in the data packets and other information such as routing tables. The forwarding engine is further coupled to a route processor 270(1) or 270(2) by, for example, a high-speed direct memory access channel, which provides a path for packets to pass back and forth between the route processor and the forwarding engine. Using this path, the route processor can receive packets that are not processed by the forwarding engine, such as route updates, and can send packets to the forwarding engine for transmission to the line cards. The route processor can also be configured to have memory-mapped access to all of the state information within the forwarding engine. The route processor can use this access to, for example, configure various tables and lists used by processors in the forwarding engine. The forwarding engine can also be coupled to a buffer 280(1) or 280(2) for handling packets waiting to be processed by the forwarding engine.

FIG. 2 further illustrates a data path 290 coupling routing engine 220(1) with routing engine 220(2). Data path 290 is used by the routing engines for redundancy negotiation such as synchronizing a state of various components of the routing engines as is discussed more fully herein.

Synchronizing State Between an Active and Standby Routing Engine

In general, an aggregation router can see a large number of dynamic sessions which exist for varying durations. Such dynamic sessions can range from, for example, mobile wireless sessions with a high call rate and very short-lived sessions to a high volume of "always on" sessions. Establishing these sessions can involve a high degree of off-box communication to authenticate the session and determine the set of features which should be applied to the session. This can be further complicated by providing an ability to associate discretionary user-selected feature sets with the session. This combination of session density, high-call rate, and volume of features involved in a given session can result in a significant amount of data to be provided to standby routing engine.

Figure 3:
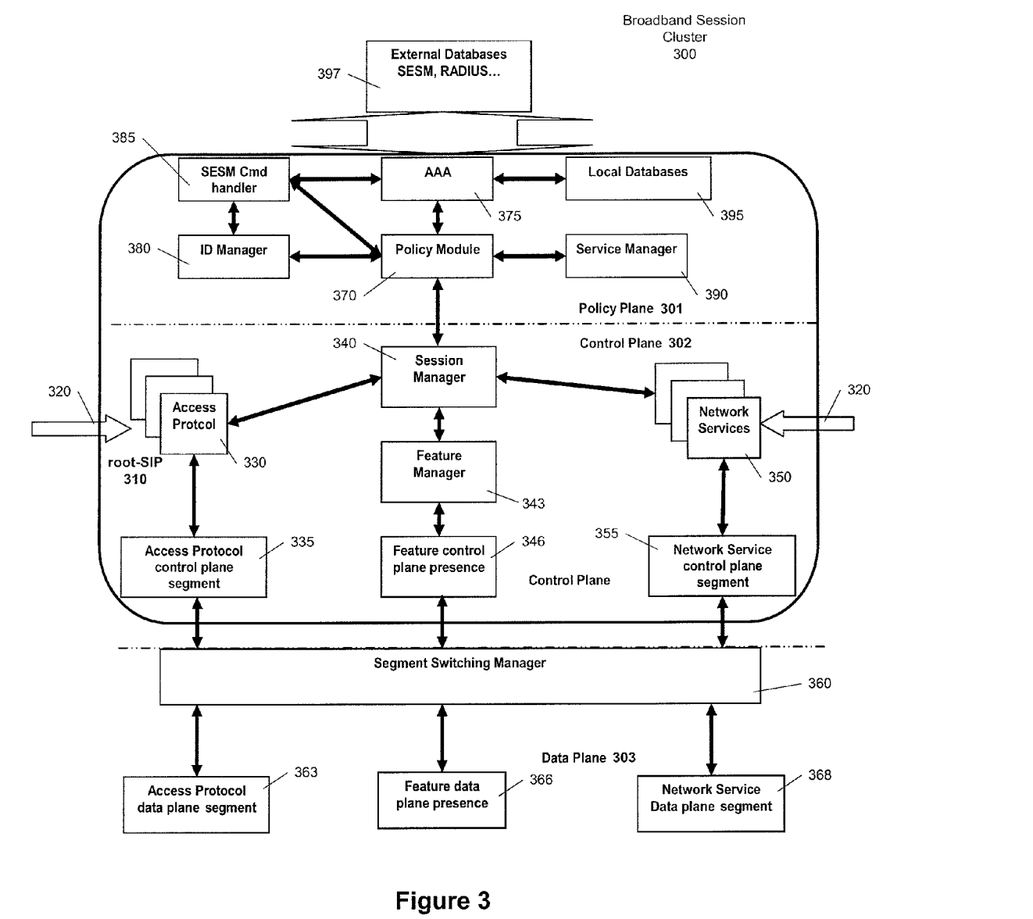
FIG. 3 is a simplified block diagram illustrating an example of a software architecture used by a routing engine incorporating embodiments of the present invention.

FIG. 3 is a simplified block diagram illustrating an example of a software architecture used by a routing engine (e.g., 220). FIG. 3 illustrates that there can be several components involved in set up and maintenance of a session handled by a routing engine. Many of the components contain state that needs to be rebuilt on a standby routing engine for the session to be properly maintained after a switchover from an active routing engine to the standby routing engine.

FIG. 3 further illustrates that a broadband session involves a complex interaction between possibly dozens of components. Each of these components can have complicated interactions and associations with the other components of the broadband session. Each component plays a part in establishing and policing the whole session, and creation of a session can involve dozens of messages creating dozens of relationships between the components. In the case of broadband, these components can be tightly bound to one another, therefore state data from one component in a session is useless without state data for that session from other components involved in the creation of the session. Therefore, embodiments of the present invention synchronize the state data for all components playing a part in a session together, rather than separating each component, so that the entire session can be recreated on the standby routing engine. The following discussion describes an example of establishing the relationships between components participating in a session.

FIG. 3 illustrates a broadband session cluster 300, that includes all components participating in a example session. The broadband session cluster is logically divided between a policy plane 301, a control plane 302 and a data plane 303. In order to provide state to a standby routing engine, state in the active routing engine is tracked from the beginning of a session until the end of a session. Initiation and termination of a session are marked by communications external to the routing engine. A root subscriber initiation process 310 ("root-SIP") is typically responsible for the "first sign of life" (FSOL) for a session. An FSOL can be associated with an interface up event, a protocol event such as with PPPoE or L2TP, answering of a dial call, creation of an IP session based on a traffic flow, and the like. Such events are illustrated by arrows 320 from sources external to the broadband session cluster directed to Access Protocol 330 and Network Services 350 from services external to the broadband session of the components Root-SIP 310 maintains information from the FSOL event, requests an Authentication, Authorization, Accounting (AAA) unique ID, Segment Switching Manager (SSM), segment IDs, and makes a service request of session manager 340, providing the requisite session identification keys.

External data that is used to build state of components, such as Access Protocol module 330, is recorded as checkpoints to be played back to the standby routing engine. This playing back of external data allows for the building of state on the corresponding components of the standby in the same manner as the states are built on the active. Root-SIP 310 registers itself with a cluster control manager (CCM) (not shown) which collects the per-session checkpoint data for a broadband session cluster prior to providing that information to the standby routing engine. The root-SIP can register itself with the CCM as a required component and the session initiator for the session.

Session manager 340 registers keys from root-SIP 310 with ID manager 380 and passes a service request to policy module 370. ID manager 380 functions as a repository for keys (e.g., IDs) collected during a session. Session manager 340 can also register with the CCM as a required component, thus enabling session manager 340 to have a roll in controlling when checkpointing of session data is completed.

It should be noted that session manager 340 will not have checkpoint data to contribute when checkpoint data is provided to the standby routing engine because session manager 340 does not communicate directly to sources external to the routing engine. A session manager on the standby routing engine recreates its state via the replaying of messages provided to components connected to the session manager and the subsequent communication of information by those components to the session manager. This type of state building also occurs with other components that do not engage in direct communication with sources external to broadband session cluster 300.

Policy module 370 executes policy rules and makes authorization requests to appropriate authorization libraries. In scenarios involving user-defined or stateful rules (e.g., rules with changing versions), policy manager 370 will register with the CCM and provide checkpointed rules along with configuration version information. Policy module rules can also result in other information, which are passed back to root-SIP 310, which then can start a child SIP (e.g., a PPP SIP). The child SIP can then register with the CCM as a required component and perform additional tasks to collect information such as username and other keys to provide back to policy module 370.

When authentication, authorization, accounting (AAA) library 375 is used, AAA 375 retrieves authentication/authorization information from local databases 395 and databases external to the routing engine such as a RADIUS server (397). For such an external authorization, the response (e.g., a RADIUS response) is also checkpointed to the CCM. AAA authorization data can be provided to root-SIP 310, forwarding service process (e.g., Network Services 350), and feature and service directed blocks (e.g., Feature Manager 343). Policy module 370 passes these information blocks to session manager 340, which distributes the authorization data to an appropriate component. The appropriate forwarding service process (FSP) (e.g., local termination, or L2 call manager) can be initiated by session manager 340 based upon the service directive and information blocks.

The FSP (e.g., network services 350) registers itself as a required component with the CCM and set up the service. For example, in a case of local termination, a request can be made of an interface manager for a virtual interface, which can be used to locally terminate the session, if necessary. When a virtual interface is created, a data plane is created and assigned appropriate IDs. The L2 call manager needs to ensure that an L2 tunnel on a standby routing engine goes to the same endpoint configured on the active. The CCM and session manager 340 can receive an indication that the virtual interface is ready.

Session manager 340 can also initiate feature installation by transmitting feature information blocks to feature manager 343. Feature manager 343 installs the features according to information in the feature information blocks received from policy module 370, provisions the data plane as needed, and acquires segment switching manager (SSM) feature IDs and other IDs used in the data plane. Feature manager 343 indicates readiness of the features to the CCM. Root-SIP 310 processes the information blocks, which may also involve a child SIP, and then indicates to the CCM that the root-SIP is ready. A child SIP (e.g., PPP) can run through a negotiation process, and when a connection is successfully added, the child SIP can indicate to the CCM that it is also ready.

At this point, all required components are ready to provide checkpointed state to the standby routing engine. The CCM can loop through all required components to request checkpoint data. Each required component (e.g., those components gathering external data) can gather component-specific information about the session to send to the standby routing engine. For example, when feature manager 343 receives notification from the CCM, the feature manager loops through all installed features for the session and collects checkpoint data for those features. Once all checkpoint data has been collected, the CCM can transmit the checkpoint data to the standby routing engine.

A corresponding CCM on the standby routing engine receives the checkpoint data from the CCM on the active routing engine, and then contacts a designated session initiator (e.g., a root-SIP) to reconstruct the session on the standby routing engine. Using the checkpoint information stored by the CCM (e.g., in a data buffer), a root-SIP 310 on the standby routing engine creates a context, calls AAA 375 on the standby routing engine to request the same AAA unique ID as provided on the active routing engine, calls SSM 360 on the standby routing engine requesting the same SSM IDs as provided on the active routing engine, and makes a service request to session manager 340 on the standby routing engine as was done on the active routing engine. Root-SIP 310 and session manager 340 establish a relationship as was performed on the active routing engine. But handles and process IDs that are exchanged between the components are only locally significant and are not checkpointed by the active routing engine to the standby routing engine.

As on the active routing engine, session manager 340 registers keys with ID manager 380 on the standby routing engine. These components will typically be largely agnostic to high access functionality, and will not have received checkpointed data from the active routing engine. For example, keys are given to ID manager 380 on the standby in substantially the same manner as they are provided to the ID manager on the active routing engine. Alternatively, an ID manager can be a repository database of information about the session. In such a scenario, the database information can be checkpointed to the standby routing engine.

Session manager 340 passes the request up to protocol module 370 which runs the same rules that were performed on the active routing engine, using the same version of command line interface and selecting the same AAA library. Using the AAA unique ID checkpointed by the active routing engine, AAA 375 on the standby routing engine will return the same set of authorization data that was returned on the active routing engine.

The authorization data is then transformed into information blocks used by the SIPs, FSPs and features as was performed on the active routing processor. The standby local-term forwarding service process is initiated with the same FSP information data provided on the active. The FSP will make a directed request to an interface manager for a specific virtual interface using a set of identifiers that match those used on the active routing engine. This request is satisfied when the appropriate virtual interface are available. The data plane is provisioned via SSM 360 using the checkpointed SSM IDs and reports back to session manager 340.

Standby routing engine session manager 340 initiates feature installation as was performed on the active routing engine. Feature manager 343 initiates feature installation and the various features retrieve checkpointed SSM feature IDs and any feature-specific state from the CCM and use this information to provision the data plane. For example, an L2 call manager will use a combination of checkpointed data and authorization data when sending a session install request to an L2TP protocol socket. Upon completion of feature installation, session manager 340 provides information to root-SIP 310 on the standby routing engine. SIPs (root and child) process SIP information as was performed on the active routing engine but use checkpoint data in lieu of communication information with external sources. At this point, the session is established on the standby routing engine.

After the above-described initial synchronization, the CCM allows per-component dynamic checkpointing for the remainder of the session. Dynamic checkpointing permits checkpointing of various external events that are required to be replayed on the standby routing engine. This includes, for example, AAA push operations, re-authentication, protocol sniffing (e.g., IGMP snooping), and proxies (e.g., dynamic host configuration protocol).

At the close of a session, the root-SIP on the active routing engine either initiates termination or is notified that the session was terminated. Similar to the initial event beginning the life of a session, the termination event is checkpointed to the standby routing engine. The standby routing engine then releases state associated with the session in the same manner as performed on the active.

As the above description of session synchronization illustrates, a session is recreated on a standby routing engine as if the standby session was a new session starting up on the active routing engine. A distinction is that state-building events external to the broadband session cluster are "replayed" into the corresponding components within the standby routing engine from checkpoint data provided by the active routing engine. External events, like packets from a peer or responses from a RADIUS server, are part of the data that is synchronized to the standby routing engine. It should be noted that it is not necessary to provide all external stimuli received by the active routing engine components, but only that information that ultimately contributes to the state of components in the broadband session cluster. For example, a PPPoE session can be initiated by a series of communications with an external source, but state of the components is determined by information contained in an acknowledgement (ACK) packet or series of packets upon initialization of the session. The information in those ACK packets is checkpointed for the standby routing engine.

In this manner, complex mechanisms and policies binding components of a session together, and relationships between the components, are recreated through normal processing on the standby routing engine. No reconciliation of separate components within a broadband session cluster needs to be performed. Thus, many components within the broadband session cluster need not be aware that they are on a standby routing engine rather than an active routing engine, as they are just intermediate steps in initiating a session and their state is completely derived from interactions with components inside the broadband session cluster. A prior art high-access system synchronizes over the entire data structure for a component, and then needs to reconcile that data structure with all other components that that component interacts with. Thus, the present invention avoids the complex reconciliation that can occur between as many as a dozen components found in a prior-art system.

Figure 4:
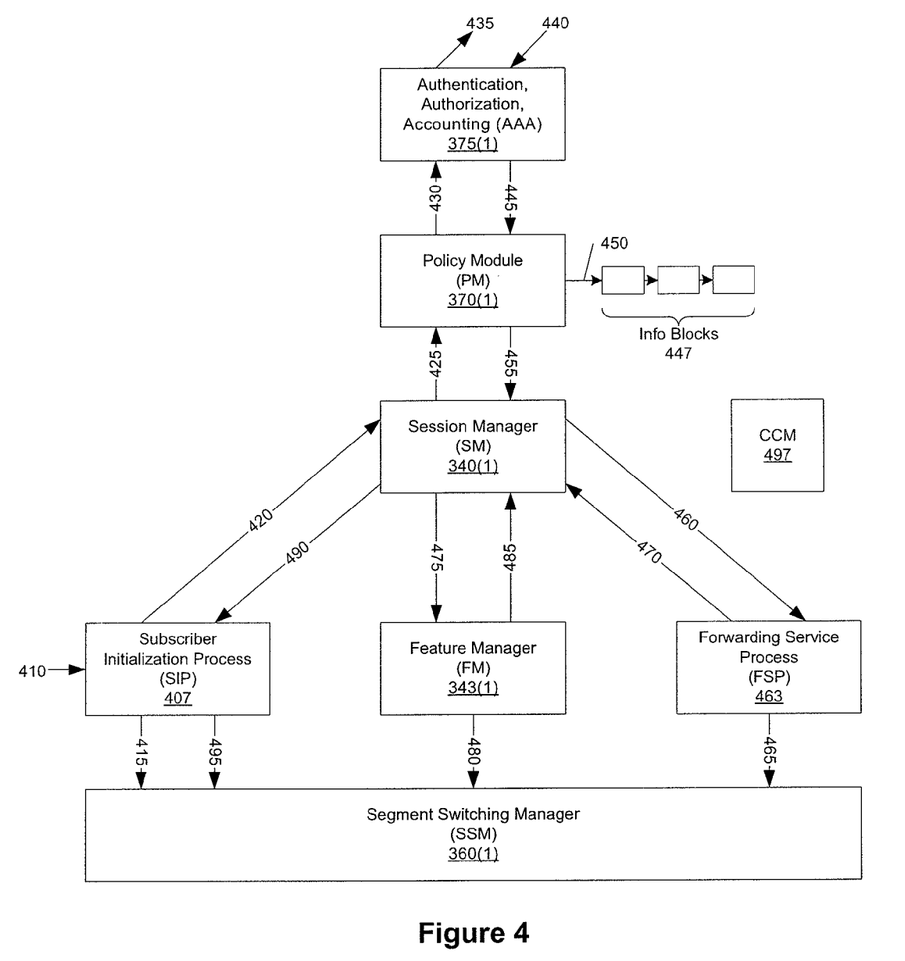
FIG. 4 is a simplified flow diagram illustrating bringing a session up to steady state on an active routing engine in accord with embodiments of the present invention.

FIG. 4 is a simplified flow diagram illustrating bringing a session up to steady state on an active routing engine in accord with embodiments of the present invention. This activity occurs after the active routing engine has been brought to an initialized state. Initially, activity occurs to start a subscriber session (410). For example, a PPPoE session request can arrive at subscriber initiation process 407 (SIP). SIP 407 can allocate a segment with the segment switching manager 360(1) (SSM) (415) (e.g., an access protocol data plane segment 363). SIP 407 sends a service request to session manager 340(1) (SM) (420). SM 340(1) then makes a service authorization request to policy module 370(1) (PM) (425). PM 370(1) sends an authentication/authorization request to authentication, authorization, accounting module 375(1) (AAA) (430). AAA 375(1) can request either local or external configuration information (435). AAA 375(1) then receives the response to the request for local or external configuration information (440). Once received, AAA 375(1) sends the authentication/authorization information to PM 370(1) (445).

PM 370(1) can call SIP/forwarding service process (FSP)/features to create information blocks 447 from the received authorization information (450). PM 370(1) also provides a service directive to SM 340(1) (455). In response, SM 340(1) initiates the service with FSP 463 (460).

FSP 463 allocates and provisions another segment with the segment switching manager 360(1) (465). FSP 463 then indicates to SM 340(1) that the segment is connected (470).

SM 340(1) can call feature manager 343(1) (FM) to install features on the provisioned segments (475). FM 343(1) then calls each feature's registered "apply" API on SSM 360(1) (480). FM 343(1) then indicates to SM 340(1) that the features have been applied (485).

In response, SM 340(1) indicates to SIP 407 that the session is connected (490). SIP 407 can then provision the segment (495) and checkpoint to the cluster control manager 497 (CCM). CCM 497 then contacts each component participating in the session and checkpoints data to the standby routing engine.

Figure 5:
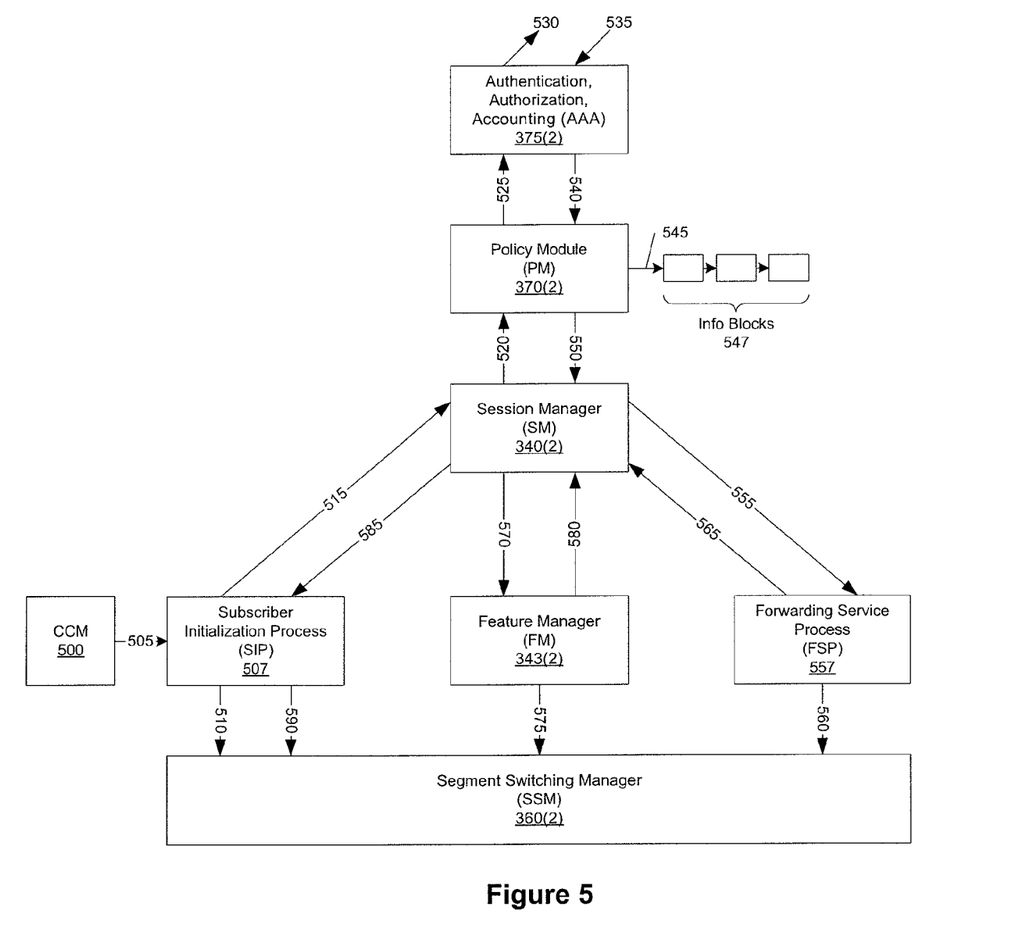
FIG. 5 is a simplified flow diagram illustrating bringing a session up to a steady state on the standby routing engine, in accord with embodiments of the present invention.

FIG. 5 is a simplified flow diagram illustrating bringing a session up to a steady state on the standby routing engine, in accord with embodiments of the present invention. CCM 500 on the standby routing engine receives the checkpointed information from the active routing engine and starts a replay of the subscriber session with the subscriber initiation process 507 (SIP) on the standby routing engine (505). SIP 507 allocates the segment with the standby routing engine SSM 360(2) using the checkpoint data (510). SIP 507 sends a service request to standby routing engine SM 340(2) (515). SM 340(2) transmits a service authorization request to standby routing engine PM 370(2) (520). PM 370(2) sends an authentication/authorization request to standby routing engine AAA module 375(2) (525).

As with the active routing engine, standby routing engine AAA 375(2) requests either local or external (to the standby routing engine) configuration information (530). In response to that request, AAA 375(2) receives configuration information from either a database on the standby routing engine or from checkpointed information (e.g., checkpointed RADIUS information) (535). AAA 375(2) then sends the authentication/authorization reply to PM 370(2) (540).

PM 370(2) then calls SIP/FSP/features to create information blocks 547 from the authorization information (545). PM 370(2) then provides service directive information to SM 340(2) (550).

SM 340(2) initiates services with FSP 557, in response to the service directive (555). FSP 557 then allocates and provisions another segment on SSM 360(2) with checkpoint data (e.g., SSM feature ID) (560). FSP 557 indicates to SM 340(2) that the segment is connected (565).

SM 340(2) then calls the standby routing engine FM 343(2) to install features on the provisioned segments (570). FM 343(2) calls each feature's registered "apply" API and each feature will request from FM 343(2) any associated checkpoint data (575). FM 343(2) then indicates to SM 340(2) that the features are applied to the segments (580).

SM 340(2) indicates to SIP 507 that the segments are connected (585). SIP 507 provisions the initial segment with checkpoint data (590). At this point, the standby routing engine has completed initial synchronization and the session is established on the standby routing engine.

Switchover from Active Routing Engine to Standby Routing Engine

Redundant routing engines allow provision of high access to a network router in the event that a switchover between the active routing engine and the standby routing engine becomes necessary. There are many reasons why a switchover may be triggered, including, for example, a CLI command associated with a software upgrade or a configuration change, or a software crash on the active processor. Upon such an event, a high access subsystem on the network router makes the standby routing engine the active routing engine.

During transition, the CCM performs tasks such as providing remaining checkpoint data to the standby routing engine and indicating to components of the network router when the standby routing engine is ready to become active. Switchover from the active routing engine to the standby routing engine can occur with minimal packet loss because the standby routing engine is set up and configured prior to the switchover due to the provision of checkpoint data from the active routing processor to the standby routing processor.

Other Embodiments

The present invention is well adapted to attain the advantages mentioned as well as others inherent therein. While the present invention has been depicted, described, and is defined by reference to particular embodiments of the present invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

The foregoing describes embodiments including components contained within other components (e.g., the various elements shown as components of communications unit 210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected" or "operably coupled" to each other to achieve the desired functionality.

The foregoing detailed description has set forth various examples of the present invention via the use of block diagrams, flow charts, and examples. It will be understood by those within the art that each block diagram component, flow chart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalence in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
a first processor comprising a first plurality of components, wherein
the first processor is configured to gather first state information from each of a first subset of the first plurality of components, wherein
each component of the first subset is configured to receive information from at least one remote source, and
each component of a remainder of the first plurality of components is configured to establish a state of that component using information received from one or more components of the first subset, wherein
the remainder of the first plurality of components comprises components that are not members of the first subset,
the first processor is configured to transmit the first state information to a second processor that comprises a second plurality of components, and
receipt of the first state information from the first processor causes the second processor to perform an initial synchronization of second state information of each component of the second plurality of components of the second processor with counterpart components of the first processor.

2. The apparatus of claim 1, wherein
the first processor is configured to record additional information received from the at least one remote source, subsequent to transmitting the first state information to the second processor, and
the first processor is configured to transmit the additional information to the second processor.

3. The apparatus of claim 1, wherein
the first plurality of components is configured to implement a first broadband session, and
the second plurality of components is configured to implement a redundant broadband session.

4. The apparatus of claim 2, wherein
the first processor is configured to begin recording the additional information in response to detecting initiation of a broadband session.

5. The apparatus of claim 1, wherein
the first state information comprises a subset of information received by the first processor from external sources.

6. The apparatus of claim 1, wherein
the initial synchronization provides each component of the second plurality of components with a state substantially the same as that of each corresponding component in the first plurality of components.

7. The apparatus of claim 1, wherein
the information from remote sources comprises a data stream.

8. A method comprising:
gathering first state information from each of a first subset of a first plurality of components of a first processor, wherein
   each component of the first subset is configured to receive information from at least one remote source, and
   each component of a remainder of the first plurality of components is configured to establish a state of that component using information received from one or more components of the first subset, wherein
      the remainder of the first plurality of components comprises components that are not members of the first subset, and
transmitting the first state information to a second processor that comprises a second plurality of components, wherein
   receipt of the first state information from the first processor causes the second processor to perform an initial synchronization of second state information of each component of a second plurality of components of the second processor with counterpart components of the first processor.

9. The method of claim 8, further comprising:
recording additional information received from the at least one remote source, subsequent to transmitting the first state information to the second processor, and
transmitting the additional information to the second processor.

10. The method of claim 8, wherein
the first plurality of components implements a first broadband session, and
the second plurality of components implements a redundant broadband session.

11. The method of claim 8, wherein
the first state information comprises a subset of information received by the first processor from external sources.

12. The method of claim 8, wherein
the initial synchronization provides each component of the second plurality of components with a state substantially the same as that of each corresponding component in the first plurality of components.

13. An apparatus comprising:
means for gathering first state information from each of a first subset of a first plurality of components of a first processor, wherein
   each component of the first subset is configured to receive information from at least one remote source, and
   each component of a remainder of the first plurality of components is configured to establish a state of that component using information received from one or more components of the first subset, wherein
      the remainder of the first plurality of components comprises components that are not members of the first subset, and
means for transmitting the first state information to a second processor that comprises a second plurality of components, wherein
   receipt of the first state information from the first processor causes the second processor to perform an initial synchronization of second state information of each component of a second plurality of components of the second processor with counterpart components of the first processor.

14. The apparatus of claim 13, further comprising:
means for recording additional information received from the at least one remote source, subsequent to transmitting the first state information to the second processor, and
means for transmitting the additional information to the second processor.

15. The apparatus of claim 13, wherein
the first plurality of components implements a first broadband session, and
the second plurality of components implements a redundant broadband session.

16. The apparatus of claim 13, wherein
the first state information comprises a subset of information received by the first processor from external sources.

17. The apparatus of claim 13, wherein
the initial synchronization provides each component of the second plurality of components with a state substantially the same as that of each corresponding component in the first plurality of components.

\* \* \* \* \*